(12) United States Patent
Tai et al.

(10) Patent No.: US 11,360,887 B2
(45) Date of Patent: Jun. 14, 2022

(54) MEMORY CONTROLLER AND METHOD FOR MONITORING ACCESSES TO A MEMORY MODULE

(71) Applicant: MONTAGE TECHNOLOGY CO., LTD., Shanghai (CN)

(72) Inventors: Stephen Tai, Shanghai (CN); Yi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/107,905

(22) Filed: Nov. 30, 2020

(65) Prior Publication Data
US 2021/0303459 A1 Sep. 30, 2021

(30) Foreign Application Priority Data
Mar. 25, 2020 (CN) .......................... 202010218492.7

(51) Int. Cl.
*G06F 12/02* (2006.01)
*G06F 13/16* (2006.01)
*G06F 12/14* (2006.01)
*G06F 13/42* (2006.01)

(52) U.S. Cl.
CPC ...... *G06F 12/0246* (2013.01); *G06F 12/1408* (2013.01); *G06F 12/1458* (2013.01); *G06F 13/1673* (2013.01); *G06F 13/4221* (2013.01); *G06F 2213/0026* (2013.01)

(58) Field of Classification Search
CPC ............. G06F 12/0246; G06F 12/1408; G06F 12/1458; G06F 13/1673; G06F 13/4221; G06F 2213/0026

USPC ......................................................... 711/154
See application file for complete search history.

(56) References Cited

U.S. PATENT DOCUMENTS

| | | | | |
|---|---|---|---|---|
| 5,829,023 A | * | 10/1998 | Bishop | .................. G06F 12/121 711/E12.07 |
| 2005/0193058 A1 | * | 9/2005 | Yasuda | .................... G06F 3/067 711/112 |
| 2007/0079084 A1 | * | 4/2007 | Kobara | ............... G06F 21/6218 711/154 |

(Continued)

*Primary Examiner* — Christopher B Shin
(74) *Attorney, Agent, or Firm* — Jun He Law Offices P.C.; James J. Zhu (57) ABSTRACT

The application discloses a memory controller coupled between a memory module and a host controller to control accesses of the host controller to the memory module. The memory controller comprises a central buffer coupled between the memory module and the host controller via a command/address channel, wherein the central buffer is configured to receive a command/address signal from the host controller and provide the command/address signal to the memory module. The central buffer comprises: a recognition block coupled to the command/address channel to receive the command/address signal, wherein the recognition block is configured to generate access history information based on the received command/address signal; a compression block coupled to the recognition block to receive the access history information, wherein the compression block is configured to compress the access history information; and a transmission block, wherein the compressed access history information is transmitted out from the central buffer via the transmission block.

32 Claims, 7 Drawing Sheets

(56) References Cited

U.S. PATENT DOCUMENTS

| | | | |
|---|---|---|---|
| 2008/0282031 A1* | 11/2008 | Tanoue | G06F 3/0689 |
| | | | 711/E12.001 |
| 2008/0288741 A1* | 11/2008 | Lee | G06F 11/364 |
| | | | 711/E12.002 |
| 2012/0185859 A1* | 7/2012 | Kashiwaya | G06F 9/30076 |
| | | | 718/100 |
| 2014/0068060 A1* | 3/2014 | Takahata | H04L 43/10 |
| | | | 709/224 |
| 2020/0335174 A1* | 10/2020 | Kang | G11C 29/36 |
| 2021/0232698 A1* | 7/2021 | Hayashi | G06F 21/6218 |

* cited by examiner

MEMORY CONTROLLER AND METHOD FOR MONITORING ACCESSES TO A MEMORY MODULE

FIELD OF THE INVENTION

The disclosure generally relates to memory technology, and more particularly, to a memory controller and a method for monitoring accesses to a memory module.

BACKGROUND

In current computer systems, a memory module provides data access and storage for a central processing unit (CPU) during operation. For a standard memory module designed in accordance with JEDEC standards, the central buffer (Registering Clock Driver, RCD) thereon only has buffering function and is unable to record and upload CPU access commands directed to the memory module. Therefore, it cannot fulfill the demands of users to analyze accesses of the CPU to the memory module. For another type of memory modules, such as the HSDIMM memory module from Montage Technology, the functions of recording and uploading CPU access commands are added; however, due to the limitations of the storage space for recording access commands and the transmission speed for uploading access commands, such memory modules are unable to continuously record and upload access commands from the CPU to the memory module.

Therefore, it is desired to improve the existing memory modules to achieve the functions of continuously recording and uploading CPU access commands.

SUMMARY

An objective of the present application is to provide a memory controller and a method for monitoring accesses to a memory module, which can continuously record and upload access commands of a CPU to the memory module.

In one aspect of the present application, a memory controller is provided. The memory controller is coupled between a memory module and a host controller to control accesses of the host controller to the memory module. The memory controller comprises a central buffer coupled between the memory module and the host controller via a command/address channel, wherein the central buffer is configured to receive a command/address signal from the host controller and provide the command/address signal to the memory module. The central buffer comprises: a recognition block coupled to the command/address channel to receive the command/address signal, wherein the recognition block is configured to generate access history information based on the received command/address signal, a compression block coupled to the recognition block to receive the access history information, wherein the compression block is configured to compress the access history information; and a transmission block, wherein the compressed access history information is transmitted out from the central buffer via the transmission block.

In some embodiments, the recognition block comprises an access recognition rule used for filtering and recognizing the access/address signal, and the recognition block is configured to generate the access history information based on the access recognition rule. In some embodiments, the access recognition rule comprises information about a predefined address space, and the recognition block is configured to convert the received command/address signal into the access history information based on whether an address included in the received command/address signal falls into the predefined address space.

In some embodiments, the compression block comprises a compression algorithm used for compressing the access history information.

In some embodiments, the central buffer further comprises a configuration block by which the rule or the algorithm used by the central buffer is configured in advance or dynamically. In some embodiments, the central buffer is further configured to receive configuration data from the host controller, and the configuration block is configured to configure the rule or the algorithm used by the central buffer with the configuration data.

In some embodiments, the transmission block comprises an output channel coupled to the host controller or to another external controller. In some embodiments, the output channel comprises one of a PCIe channel, a CXL channel, a SMBus channel, a DCA channel and a Wireless channel.

In some embodiments, the central buffer further comprises a recording block coupled to the recognition block to receive and store the access history information. In some embodiments, the recording block is further coupled to the compression block, and the compression block receives the access history information from the recognition block via the recording block.

In some embodiments, the central buffer further comprises a recording block coupled to the compression block to receive and store the compressed access history information. In some embodiments, the recording block is further coupled to the transmission block, and the transmission block receives the compressed access history information from the compression block via the recording block.

In some embodiments, the central buffer further comprises an encryption block configured to encrypt the compressed access history information. In some embodiments, the encryption block is further configured to select, in advance or dynamically, one of a plurality of encryption algorithms to encrypt the compressed access history information. In some embodiments, the central buffer further includes a tagging block configured to tag one or more pieces of the compressed and encrypted access history information to identify different pieces of the compressed access history information and distinguish the used encryption algorithms.

In some embodiments, the central buffer further comprises a tagging block configured to tag one or more pieces of the compressed access history information to identify different pieces of the compressed access history information.

In other aspects of the present application, a memory comprising the memory controller and the memory module mentioned above is provided; and a computer system comprising the memory mentioned above is also provided.

In another aspect of the present application, a method for monitoring accesses to a memory module is provided, wherein the memory module is coupled to a host controller via a memory controller, the memory controller comprises a central buffer which is coupled between the host controller and the memory controller via a command/address channel, and the central buffer is configured to receive a command/address signal from the host controller and provide the command/address signal to the memory module. The method comprises: receiving the command/address signal and generating access history information based on the received command/address signal by a recognition block in the central buffer and coupled to the command/address channel; receiving the access history information and compressing the access history information by a compression block in the central buffer and coupled to the recognition block; and receiving the compressed access history information and transmitting the compressed access history information out from the central buffer by a transmission block in the central buffer.

The foregoing is the summary of the present application, which may be simplified, summarized, and details omitted. Therefore, a person skilled in the art should recognize that this part is merely an illustrative example and is not intended to limit the scope of the application in any way. This summary is neither intended to identify the key or required characteristics of the subject matter claimed to be protected nor is it intended to be an adjunct to determining the scope of the subject matter claimed to be protected.

BRIEF DESCRIPTION OF THE DRAWINGS

The foregoing and other features of the present application will be more fully understood from the following description and the appended claims taken in conjunction with the accompanying drawings. It is to be understood that these accompanying drawings merely illustrate certain embodiments in accordance with the present disclosure and should not be considered as limiting the scope of the present application. The present disclosure will be illustrated more clearly and in more detail with the accompanying drawings.

DETAILED DESCRIPTION OF THE DRAWINGS

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 1:
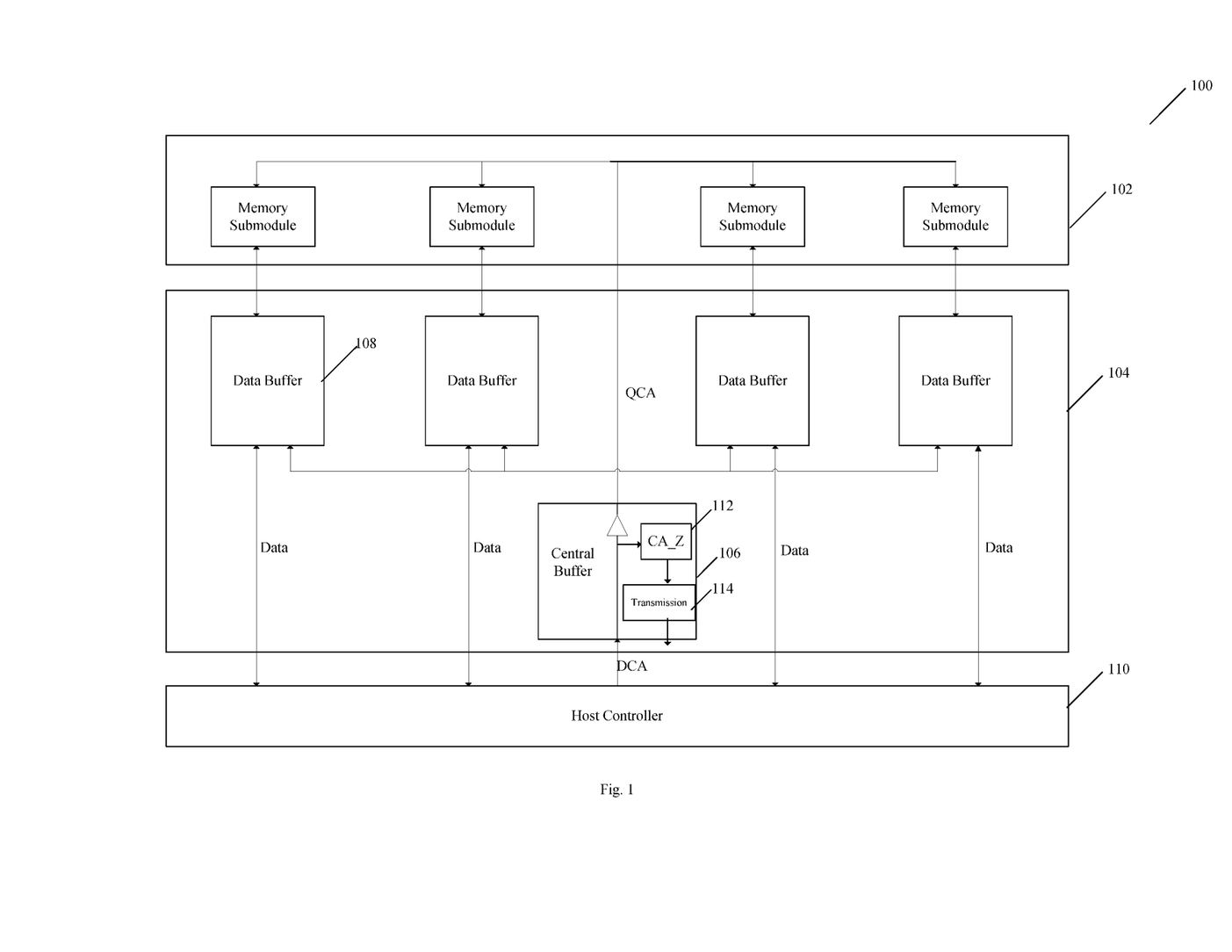
FIG. 1 illustrates a memory system according to an embodiment of the present application.

FIG. 1 illustrates a memory system 100 according to an embodiment of the present application.

As illustrated in FIG. 1, the memory system 100 comprises a memory module 102, which is constructed as a memory module group, for storing data. In some embodiments, the memory module 102 may be a memory module in accordance with the JEDEC Double Data Rate Synchronous Dynamic Random Access Memory (SDRAM) standards including, for example, the JEDEC DDR, DDR2, DDR3, DDR4, DDR5 and other DDR standards. Moreover, the memory module may also be an internal memory module in accordance with other standards or protocols (e.g. the RAMBUS internal memory) and may also be a memory module in accordance with future memory standards or protocols. In some embodiments, the memory module 102 may include a volatile memory (e.g., DRAM), a non-volatile memory (e.g., flash memory, such as NAND or NOR flash memory) or a combination thereof. In other embodiments, the memory module 102 may also be a new type of memory module manufactured through other manufacturing processes, including but not limited to: magneto-resistive memory, phase change memory, resistive memory, semi-floating gate memory, or any other type of memories. It should be noted that the memory system in FIG. 1 is merely an example. In other embodiments, the memory module may comprise only one memory bank or each memory bank may comprise more than two memory blocks, and the number of memory blocks in each memory bank may be the same or different from each other. Moreover, it should be noted that the memory module 102 described herein may be a memory die, or may include two or more memory dies.

Moreover, the structure of the memory array or memory dies included in the memory module 102 may be any appropriate interconnection structures. For example, a plurality of memory dies may form a memory module in parallel; alternatively, a plurality of memory dies may use a multi-level interconnection structure (e.g., two levels). For example, one or more memory dies are used for the first level storage, and the other one or more memory dies are used for the second level storage, so as to provide different levels of storage. The second storage level which is the lower level can exchange data with exterior of the memory module through the first storage level.

As illustrated in FIG. 1, the memory system 100 further includes a memory controller 104 which includes a central buffer 106. Specifically, the central buffer 106 is coupled between a host controller 110 and the memory module 102, and can receive a command/address (C/A) signal (which includes an access command and an access address) from the host controller 110. For example, the C/A signal may include a data storage address (i.e., the access address) in the memory module 102 and a command for accessing to (e.g., reading from or writing into) such access address. Further, the central buffer 106 can provide the received C/A signal to the memory module 102 and the memory module 102 can perform a corresponding data accessing operation according to the C/A signal. For the memory system in accordance with the DDR3 or DDR4 standard, the central buffer may be integrated into a registering clock driver (RCD). Accordingly, the central buffer 106 is coupled between the host controller 110 and the memory module 102 via a C/A channel, so as to receive the C/A signal from the host controller 110 and provide the received C/A signal to the memory module 102. For the memory system in accordance with the DDR4 standard, the C/A channel may include pins A0-A17, pins BG0-BG1 and/or pins BA0-BA1. The pins BG0-BG1 are used to determine which memory bank group in the memory module 102 is to be accessed, e.g. being written into or being read from; the pins BA0-BA1 are used to determine which memory bank in the memory module is to be accessed; and the pins A0-A17 are used for addressing and determining which memory block in the memory bank is to be accessed. Moreover, inputs to the three pins A16 (RAS_n), A15 (CAS_n) and A14 (WE_n) are used for determining the input data access command such as read command, write command or other predefined control commands.

The memory controller 104 further includes a plurality of data buffers (DB) 108. The data buffers 108 are coupled between the memory module 102 and the host controller 110, and are used for exchanging data between the memory module 102 and the host controller 110 under the control of the central buffer 106. The central buffer 106 can provide the C/A signal to the data buffers 108, and the data buffers 108 can control the data exchange between the host controller 110 and the memory block to be accessed in the memory module 102 based on the received C/A signal.

Different from the existing central buffers, the central buffer 106 includes a C/A signal monitoring block (CA_Z) 112 which is configured as a block having capability of data processing and computation. In some embodiments, the C/A signal monitoring block 112 may be implemented with software, hardware, firmware or a combination thereof. The C/A signal monitoring block 112 may recognize and compress the C/A signal received from the host controller 110, so as to generate compressed access history information of the host controller 110 to the memory module 102. Further, the central buffer 106 also includes a transmission block 114. The C/A signal monitoring block 112 may provide the compressed access history information to the transmission block 114 so that the compressed access history information can be sent out from the central buffer 106. Some examples of the central buffer will be illustrated in combination with FIG. 2 to FIG. 6.

Figure 2:
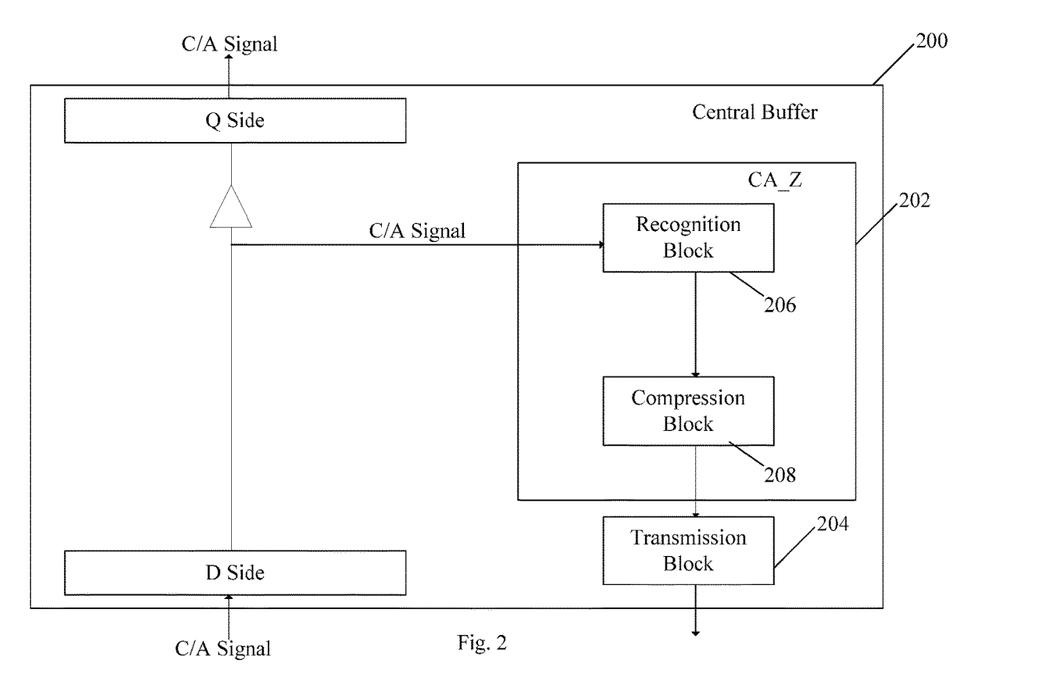
FIG. 2 illustrates a central buffer according to an embodiment of the present application.

FIG. 2 illustrates an exemplary structure of a central buffer 200 according to an embodiment of the present application.

As illustrated in FIG. 2, the central buffer 200 includes a primary signal path coupled between the receiving side (D side) and the outputting side (Q side) of the C/A channel, and includes a secondary signal path coupled to the primary signal path. The secondary signal path includes a C/A signal monitoring block 202 and a transmission block 204. For the primary signal path, it receives a C/A signal including an access command and an access address at the receiving side and outputs the C/A signal at the outputting side.

In the secondary signal path, the C/A signal monitoring block 202 may include a recognition block 206 and a compression block 208. The recognition block 206 is coupled to the primary signal path of the C/A channel to receive the C/A signals transmitted on the C/A channel. The recognition block 206 may snoop the C/A signals transmitted on the C/A channel in real-time, extract the access commands and access addresses included in the C/A signals and generate access history information based on the snooped C/A signals. The generated access history information may include access commands of the host controller (for example, the host controller 110 illustrated in FIG. 1) to the memory module (for example, the memory module 102 illustrated in FIG. 1) and the access address corresponding to each access command. In some embodiments, the recognition block 206 may extract the access address and access command included in each C/A signal and generate access history information based on information extracted from each C/A signal. In other words, the recognition block 206 may generate a piece of access history information for each C/A signal. In some embodiments, the recognition block 206 may generate a piece of access history information based on access addresses and access commands extracted from a plurality of C/A signals. In other words, the recognition block 206 may generate a piece of access history information after snooping a plurality of C/A signals. For example, the recognition block 206 may generate a piece of access history information based on access addresses and access commands extracted from five C/A signals after snooping those five C/A signals, and then generate another piece of access history information based on access addresses and access commands extracted from next five C/A signals after snooping those next five C/A signals. It can be understood by those skilled in the art that the manner how the access history information is generated and the number of C/A signals based on which a piece of access history information is generated can be flexibly configured according to the data size of the access command and the access address included in each C/A signal, and the present application is not limited to any manner and number.

Further, the recognition block 206 may include an access recognition rule for filtering and recognizing C/A signals. The recognition block 206 may generate access history information based on the access recognition rule.

In some embodiments, the access recognition rule may include information about a predefined address space, for example, a range of data storage addresses (for example, the first memory block to the third memory block included in the first memory sub-module of the memory module 102) in the memory module (for example, the memory module 102 illustrated in FIG. 1). When snooping a C/A signal, the recognition block 206 may determine whether the access address included in the C/A signal is within the predefined address space (for example, determining whether the access address included in the C/A signal is within the range of data storage addresses included in the recognition rule). In response to determining that the access address included in a C/A signal is within the predefined address space, the recognition block 206 generates access history information based on that C/A signal; otherwise, in response to determining that the access address included in a C/A signal is not within the predefined address space, the recognition block 206 does not generate access history information based on that C/A signal. In some embodiments, the predefined address space may be a secure access space specified by the system, which may, for example, store data that should be limited for accessing.

In some embodiments, alternatively or additionally, the access recognition rule may specify a predefined type of access command. For example, a range of data storage addresses (for example, the first memory block to the third memory block included in the first memory sub-module of the memory module 102) in the memory module (for example, the memory module 102 illustrated in FIG. 1) may store configuration data of the whole system, so write commands directed to such range of data storage addresses should be precisely recorded. In that case, in addition to determining whether the access address included in a C/A signal is within such range of data storage addresses, the recognition block 206 may also determine whether the access command included in the C/A signal is a write command. In response to determining that the access command included in a C/A signal is a write command, the recognition block 206 generates access history information based on that C/A signal; otherwise, in response to determining that the access command included in a C/A signal is not a write command, the recognition block 206 does not generate access history information based on that C/A signal. For the abovementioned range of data storage addresses, according to this recognition rule, the recognition block 206 only generates access history information for write commands, therefore the data size of the generated access history information is reduced and the generated access history information may then be processed (for example, the compression and the transmission as mention below) more conveniently. For another example, when a range of data storage addresses in the memory module (for example, the memory module 102 illustrated in FIG. 1) stores secure data (for example, data about trade secrets of the user), the system may also be configured to precisely record read commands directed to that range of data storage addresses. Similar as discussed above, in addition to determining whether the access address included in a C/A signal is within that range of data storage addresses, the recognition block 206 determines whether the access command included in the C/A signal is a read command, and only generates access history information based on C/A signals including a read command, so as to reduce data size of the generated access history information. It can be understood by those skilled in the art that the recognition block 206 may be configured to generate access history information for C/A signals including different types of access commands based on different needs of the memory system, and the present application is not limited to any of those types.

In some embodiments, the access recognition rule may not include any information about predefined address space but only include a predefined type of access command. In that case, the recognition block 206 does not monitor the access address included in a C/A signal but only monitor the type of access command included in a C/A signal, for example, only generating access history information for C/A signals including write commands.

The compression block 208 is coupled to the recognition block 206 to receive the access history information generated by the recognition block 206, and can compress the access history information generated by the recognition block 206. In some embodiments, the compression block 208 may compress the access history information based on the information about access addresses included in the access history information. For example, the access addresses included in a plurality of C/A signals may be a group of continuous access addresses, and those continuous access addresses may all contain a plurality of identical bits. In that case, to compress the access history information generated based on those C/A signals, the compression block 208 may extract the identical bits from the access addresses containing the identical bits as a common part and retain the different bits included in each of the access addresses, i.e., deleting the redundant bits so as to compress the plurality of continuous access addresses.

It can be understood that in practice, the data to be compressed in the access history information is mainly the data of access addresses. Therefore, the compression rates of different compression algorithms mainly reflect in the compression rates on the data of access addresses. In general, adjacent addresses in a memory module usually have the same security policy (for example, all the memory blocks included in the first submodule of the memory module 102 may have the same security policy). Therefore, for some compression algorithms that have high compression rates, they may divide the memory module into a plurality of sub-regions in a predefined way, so when compressing the access history information directed to those sub-regions, the compressed access history information may only retain information indicating that a sub-region is accessed but not retain information indicating the specific memory unit that is accessed to in that sub-region. For example, for the memory module 102 illustrated in FIG. 1, the first memory submodule is identified as a first sub-region, the second memory submodule is identified as a second sub-region, and so on. For the access history information directed to the memory module 102, it can be compressed as only indicating that a C/A signal is performing a read operation or a write operation to the first sub-region but not indicating the specific unit in the first sub-region (i.e., the first memory submodule) the read operation or the write operation is directed to, so that the data size of the access history information to be transmitted is reduced. It can be understood that the memory module can be divided into sub-regions in any manners based on practice needs, and the compression rate of a compression algorithm is associated with the number of the divided sub-regions or the size of each sub-region.

In some embodiments, for example, when the data size of the access history information is particularly large within a certain time period, the compression block 208 may also be configured to directly delete the data of access addresses from the access history information, only retaining the data of operations performed to the memory module (for example, write operation, read operation and the like) and the number of times corresponding to each operation, or include more or less parameters and statistical information. For example, the access history information may only indicate that thirty read operations and twenty write operations are performed to the memory module but not indicate the access addresses that the read operations or write operations are directed to, so as to ensure the real-time transmission of the access history information (as discussed in detail below).

It can be understood that the compression block 208 may use other compression algorithms such as Huffman Coding, Rice algorithm, LZ77 algorithm and the like to compress the access history information generated by the recognition block 206, and the present application is not limited to any of those algorithms.

The transmission block 204 is coupled to the compression block 208 to receive the compressed access history information from the compression block 208, and can transmit the compressed access history information out from the central buffer 200. The transmission block 204 may include an output channel coupled to the host controller or another external controller (not shown in FIG. 2; the external controller may include another device that the user may use to analyze the access history information, for example, a computer, a cell phone, a tablet computer or the like, and the present application is not limited to any one of those devices). The access history information compressed by the compression block 208 may be transmitted to the coupled host controller or the coupled other device via the output channel. In some embodiments, the output channel may be a high-speed channel, for example, a PCIe channel, a CXL channel, a Wireless channel or the like, which is adapted for outputting information at a high speed, so as to increase the speed of the transmission block 204 for transmitting data. In some embodiments, the output channel may also be a SMBus channel (adopting I²C Protocol or other similar protocols), a DCA channel (which is configured as a bidirectional communication channel between the host controller and the central buffer) or the like.

It can be understood by those skilled in the art that in some cases, the speed of the transmission block 204 for transmitting data is limited; compared with the data size of the access history information originally generated by the recognition block 206, the limited transmission speed of the transmission block 204 may not be able to satisfy the requirement of transmitting the access history information in real time. In view of that, compressing the access history information by the compression block 204 can significantly reduce the data size of the access history information to be transmitted by the transmission block 204. In some embodiments, by selecting and configuring an appropriate compression algorithm for the compression block 208 to achieve an appropriate compression rate and by selecting a output channel with an appropriate data transmission speed for the transmission block 204, the data size of the compressed access history information generated by the compression block 208 can match with the data transmission speed of the transmission block 204 (for example, the data size of the compressed access history information generated in real-time does not exceed the maximum speed of the transmission block 204 for transmitting data), so that the access history information can be transmitted in real-time.

Figure 3:
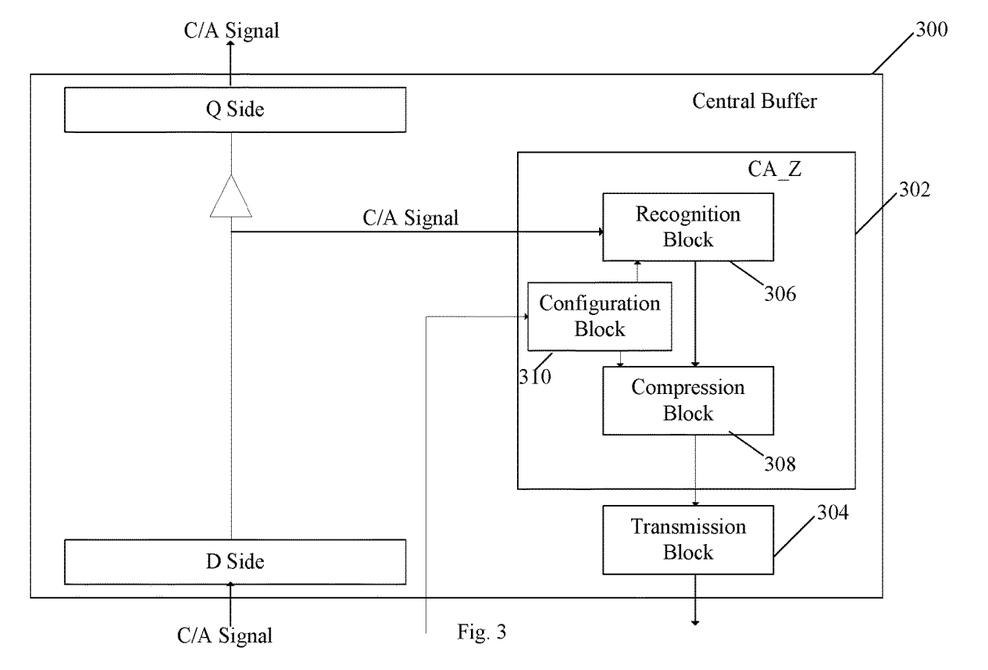
FIG. 3 illustrates a central buffer according to another embodiment of the present application.

FIG. 3 illustrates an exemplary structure of a central buffer 300 according to another embodiment of the present application. The central buffer 300 has a structure that is substantially similar to the structure of the central buffer 200 shown in FIG. 2. For example, the central buffer 300 also includes a C/A monitoring block 302 and a transmission block 304, and the C/A monitoring block 302 also includes a recognition block 306 and a compression block 308. These components have the same functions as in FIG. 2 and will not be repeated herein.

The central buffer 300 further includes a configuration block 310. The configuration block 310 is coupled to the recognition block 306 and/or the compression block 308, therefore the access recognition rule of the recognition block 306 and the compression algorithm of the compression block 308 can be configured in advance or dynamically. In an embodiment, the access recognition rule of the recognition block 306 and the compression algorithm of the compression block 308 can be configured in advance, i.e., the access recognition rule of the recognition block 306 and the compression algorithm of the compression block 308 are configured before the operation of the whole memory system (for example, the memory system 100 illustrated in FIG. 1). In another embodiment, the access recognition rule of the recognition block 306 and the compression algorithm of the compression block 308 are configured dynamically during the operation of the whole memory system (for example, the memory system 100 illustrated in FIG. 1), for example, configured according to operation conditions.

In some embodiments, the configuration block 310 can be coupled to the host controller (for example, the host controller 110 illustrated in FIG. 1), therefore the configuration data can be transmitted to the configuration block 310 via the host controller to configure the access recognition rule and the compression algorithm. In some embodiments, the configuration block 310 can be coupled to an external controller (not shown), so the configuration data can be transmitted to the configuration block 310 via the external controller to configure the access recognition rule and the compression algorithm.

In some embodiments, the configuration block 310 can store multiple groups of predefined configuration data used for configuring the access recognition rule of the recognition block 306 and the compression algorithm of the compression block 308. The configuration block 310 may be coupled to the host controller (for example, the host controller 110 illustrated in FIG. 1) or an external controller as discussed above to receive a configuration command. The configuration command can select one from the multiple groups of predefined configuration data to configure the access recognition rule of the recognition block 306 and the compression algorithm of the compression block 308.

In some embodiments, the configuration block 310 can automatically configure the access recognition rule of the recognition block 306 and the compression algorithm of the compression block 308. In an embodiment, the configuration block 310 may store multiple groups of predefined configuration data for configuring the access recognition rule of the recognition block 306 and the compression algorithm of the compression block 308, and the configuration block 310 may also store different conditions for applying the groups of predefined configuration data. During the operation of the memory system (for example, the memory system 100 illustrated in FIG. 1), the configuration block 310 may automatically apply a group of predefined configuration data in response to that the condition for applying that group of predefined configuration data is satisfied, so as to automatically and dynamically configure the access recognition rule and/or the compression algorithm. For example, the configuration block 310 may include three different groups of predefined configuration data: a group A of predefined configuration data, a group B of predefined configuration data and a group C of predefined configuration data. Among these groups of predefined configuration data, the compression rate of the compression algorithm included in the group A is larger than the compression rate of the compression algorithm included in the group B, and the compression rate of the compression algorithm included in the group B is larger than the compression rate of the compression algorithm included in the group C. The configuration block 310 may apply the group A when the data size of the access history information generated by the recognition block 310 is larger than a threshold $\alpha$, may apply the group C when the data size of the access history information generated by the recognition block 310 is smaller than a threshold $\beta$, and may apply the group B when the data size of the access history information generated by the recognition block 310 is between the threshold $\alpha$ and $\beta$, wherein the threshold $\alpha$ is larger than the threshold $\beta$.

In the embodiment that the configuration block 310 is coupled with the host controller, the coupling between the configuration block 310 and the host controller is realized via an existing channel (for example, the C/A channel). For example, a configuration command decoding table can be predefined in the configuration block 310 or other blocks included in the central buffer, which contains correspondence relationships between the configuration data/configuration commands and the signals transmitted on the C/A channel. The host controller may transmit a signal via the C/A channel when the C/A channel is idle, and that signal may be converted into configuration data or a configuration command based on the configuration command decoding table so as to configure the configuration block 310. It can be understood that in some embodiments, the configuration data may also be transmitted to the central buffer via the C/A channel without being decoded, and the configuration block can be directly configured with such configuration data.

In some embodiments, the channel for transmitting the configuration data or configuration commands to the configuration block 310 may be different from the channel for the transmission block 340 to transmit the access history information, so the transmission of the configuration data or configuration commands may not occupy the channel for the transmission block 340 to transmit the access history information. For example, an additional channel may be provided for transmitting the configuration data or configuration commands. In such embodiments, the configuration/selection of the access recognition rule and/or the compression algorithm may not affect the transmission of the access history information, therefore the configuration of the access recognition rule and/or the compression algorithm can be performed simultaneously with the transmission of the access history information so the access recognition rule and/or the compression algorithm can be configured dynamically.

It can be understood that in some embodiments, the transmission block 304 can be coupled to the host controller or an external controller via a bidirectional channel, and the transmission block 304 may have a capability of receiving data or signals, therefore the configuration data/configuration command may be received via the transmission block 304.

Figure 4:
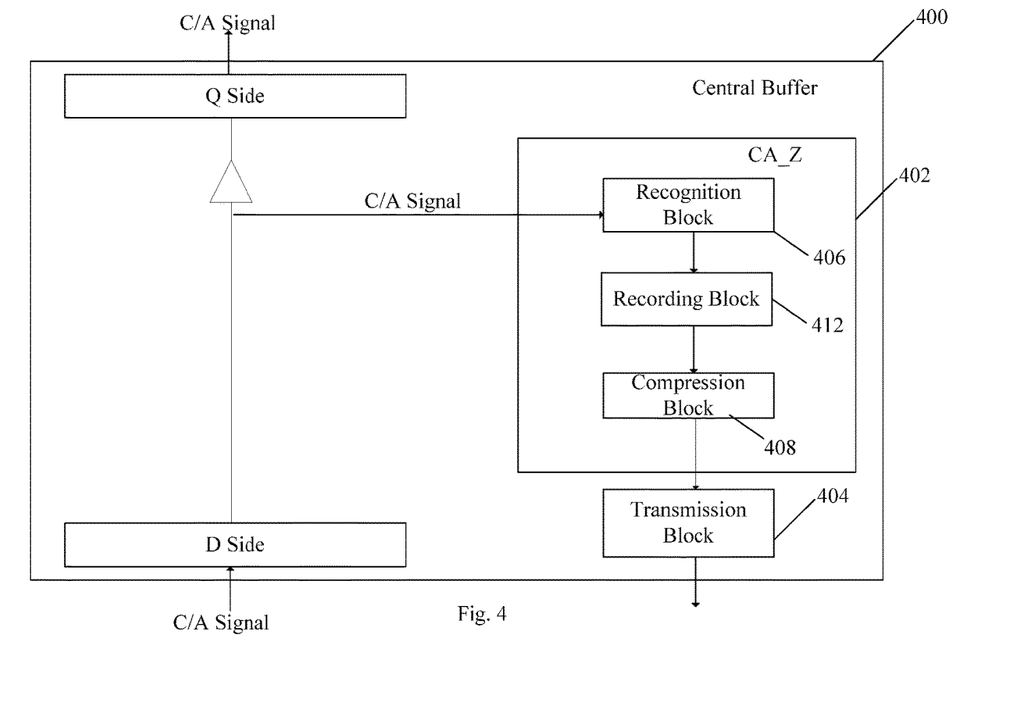
FIG. 4 illustrates a central buffer according to another embodiment of the present application.

FIG. 4 illustrates an exemplary structure of a central buffer 400 according to another embodiment of the present application. The central buffer 400 has a structure that is substantially similar to the structure of the central buffer 200 in FIG. 2. For example, the central buffer 400 includes a C/A monitoring block 402 and a transmission block 404, and the C/A monitoring block 402 includes a recognition block 406 and a compression block 408. These components have the same functions as those in FIG. 2 and will not be repeated herein.

The central buffer 400 further includes a recording block 412. The recording block 412 is coupled to the recognition block 406 to receive the access history information generated by the recognition block 406. In such embodiments, the recording block 412 may store the access history information received from the recognition block 406 so as to, for example, conveniently query the original uncompressed access history information.

Optionally, the recording block 412 is also coupled to the compression block 408, i.e. coupled between the recognition block 406 and the compression block 408, so the compression block 408 receives the access history information from the recognition block 406 through the recording block 412. In such embodiments, since the access history information is first stored in the recording block 412, the compression block 408 may flexibly analyze and compress multiple pieces of access history information together. For example, for the compression algorithm mentioned above that compresses the access history information based on the access addresses included in the access history information, since the access history information is stored in the recording block 412, the compression block 408 may analyze multiple pieces of access history information and determine whether there are multiple pieces of access history information including a series of continuous addresses, so as to determine whether it is desired to delete (or hide) the same bits included therein to perform the compression.

Figure 5:
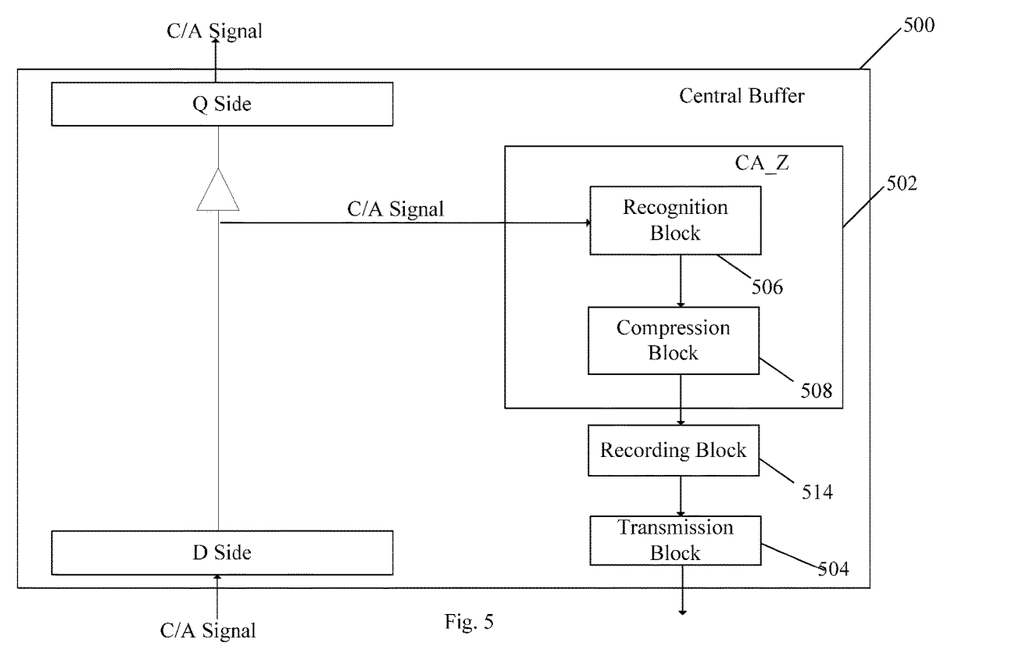
FIG. 5 illustrates a central buffer according to another embodiment of the present application.

FIG. 5 illustrates an exemplary structure of a central buffer 500 according to another embodiment of the present application. The central buffer 500 has a structure that is substantially similar to the structure of the central buffer 200 in FIG. 2. For example, the central buffer 500 includes a C/A monitoring block 502 and a transmission block 504, and the C/A monitoring block 502 includes a recognition block 506 and a compression block 508. These components have the same functions as those in FIG. 2 and will not be repeated herein.

The central buffer 500 further includes a recording block 514. The recording block 514 is coupled to the compression block 508 to receive the compressed access history information generated by the compression block 508. In such embodiments, the recording block 514 may store the compressed access history information received from the compression block 508 so as to, for example, conveniently query the compressed access history information.

Optionally, the recording block 510 may also be coupled to the transmission block 504, i.e., coupled between the compression block 508 and the transmission block 504, so the transmission block 504 receives the compressed access history information from the compression block 508 through the recording block 514. In other words, the recording block 514 serves as a buffer for the compressed access history information. This is beneficial when the data size of the compressed access history information to be transmitted is relatively large during a time period. Because the compressed access history information is first stored in the recording block 514, the transmission block 504 may sequentially process the backlogged compressed access history information.

It can be understood by those skilled in the art that for the central buffer of the present application, it may include both a first recording block (for example, the recording block 412 illustrated in FIG. 4) coupled between the recognition block and the compression block and a second recording block (for example, the recording block 514 illustrated in FIG. 5) coupled between the compression block and the transmission block, so as to store both the originally generated access history information and the compressed access history information.

Figure 6:
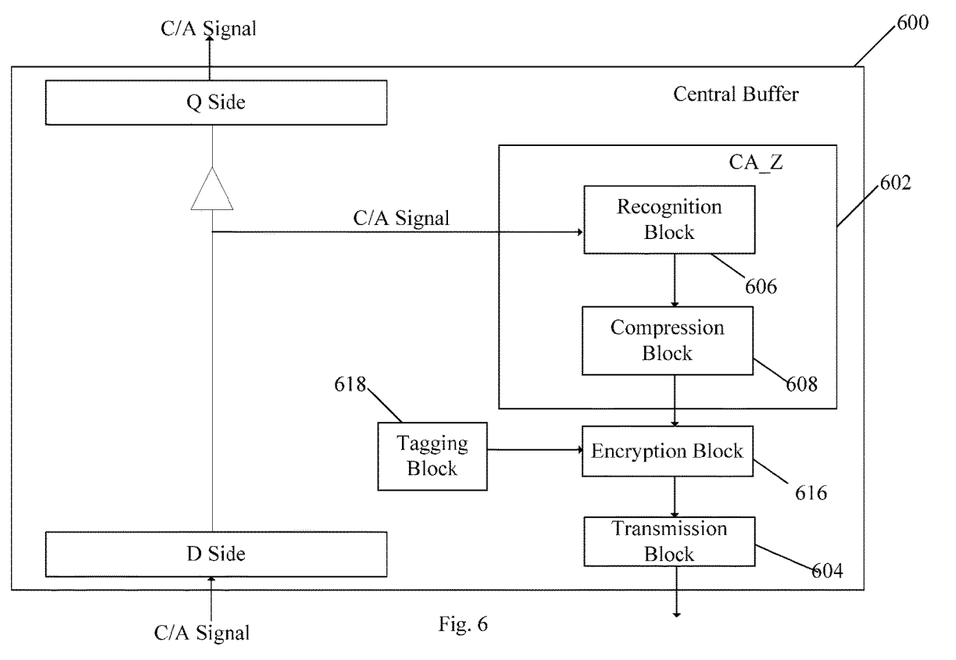
FIG. 6 illustrates a central buffer according to another embodiment of the present application.

FIG. 6 illustrates an exemplary structure of a central buffer 600 according to another embodiment of the present application. The central buffer 600 has a structure that is substantially similar to the structure of the central buffer 200 in FIG. 2. For example, the central buffer 600 includes a C/A monitoring block 602 and a transmission block 604, and the C/A monitoring block 602 includes a recognition block 606 and a compression block 608. These components have the same functions as those in FIG. 2 and will not be repeated herein.

As illustrated in FIG. 6, the central block 600 further includes an encryption block 616 which is coupled between the compression block 608 and the transmission block 604. The encryption block 616 may receive the compressed access history information generated by the compression block 608 from the compression block 608 and may encrypt the compressed access history information. The encryption block 616 may use any existing encryption algorithm to encrypt the compressed access history information, for example, SM2 algorithm, SHA-256 algorithm or the like, and the present application is not limited to any of these algorithms. Encrypting the compressed access history information by the encryption block 616 can improve the security of data transmission. The encryption block 616 may be configured to dynamically select one encryption algorithm from a plurality of encryption algorithms to encrypt the compressed access history information, so as to further improve the security of data transmission. For example, the central buffer may further include a configuration block (not shown) coupled to the encryption block, and such configuration block may configure the encryption algorithm of the encryption block 616 in a way that is similar as the configuration block 310 illustrated in FIG. 3 above.

Optionally, the central buffer may further include a tagging block 618 which is coupled to the encryption block 616 to tag the compressed and encrypted access history information.

In one embodiment, the tagging block 618 may tag the compressed and encrypted access history information based on the time for generating the information, for example, tagging a time stamp to the compressed and encrypted access history information to indicate the time point at which the compressed and encrypted access history information is generated. In some other examples, the tagging block 618 may automatically generate a tag based on other tag generation rule (which is predefined in the tagging block 618); accordingly, the external device or application that receives the encrypted access history information may also be preconfigured with a corresponding tag generation or recognition rule. In this way, the different encryption algorithms can be indicated with different tags, so that the corresponding decryption algorithms can be determined to decrypt the encrypted information. With the tag made by the tagging block 618, the compressed and encrypted access history information can be better classified. For example, when the encryption algorithms of the encryption block 616 are dynamically configured, the pieces of encrypted access history information generated at time point 1 to time point 5 are encrypted with the encryption algorithm A and the pieces of encrypted access history information generated at time point 6 to time point 10 are encrypted with the encryption algorithm B. With the tag made by tagging block 618, the time point at which each piece of encrypted access history information is generated can be conveniently determined, and therefore the encryption algorithm used for encrypting each piece of encrypted access history information can be determined. After determining the encryption algorithm used for encrypting each piece of encrypted access history information, the encrypted access history information then can be decrypted with corresponding decryption algorithm.

In another embodiment, the tagging block 618 may divide the compressed and encrypted access history information into groups in a specific way and tag each group of compressed and encrypted access history information with a group tag. A group of compressed and encrypted access history information may generally be processed similarly. For example, the encryption block 616 may store three different encryption algorithms. The tagging block 618 may classify the first piece of access history information to the fifth piece of access history information into the first group, classify the sixth piece of access history information to the tenth piece of access history information into the second group and classify the eleventh piece of access history information to the fifteenth piece of access history information into the third group. The tagging block 618 may recurrently classify the sixteenth piece of access history information to the twentieth piece of access history information into the first group and so on. Accordingly, the encryption block 616 may apply the first encryption algorithm to the first group of access history information, may apply the second encryption algorithm to the second group of access history information and may apply the third encryption algorithm to the third group of access history information. The tagging block 618 may tag each group of access history information with the corresponding group tag. With such group tags, the encryption algorithm used for encrypting each group of access history information can be directly determined. After determining the encryption algorithm used for encrypting each group of encrypted access history information, the access history information can then be decrypted accordingly with the corresponding decryption algorithm. Further, the correspondence relationships between the encryption algorithms and the groups of access history information can be protected with another encryption method, for example, being encrypted with another algorithm, therefore only the authorized applications and users can obtain such correspondence relationships based on the known algorithm and data security is further improved. In addition, the correspondence relationships between the encryption algorithms and the groups of access history information can be dynamically configured or changed.

In the abovementioned embodiment, the access history information is classified into groups based on the sequence of the access history information. It can be understood by those skilled in the art that the tagging block 618 can also classify the compressed and encrypted access history information into groups in other ways, for example, classifying the access history information into groups based on the information of access addresses (e.g., classifying the access history information directed to the same submodule into the same group), classifying the access history information into groups based on information about access command (e.g., classifying the access history information including write commands into the same group and classifying the access history information including read commands into the same group) and classifying the access history information into groups based on the generation time (e.g., classifying the access history information generated in a specific unitary time period into the same group) etc., and the present application is not limited to any of those ways.

It can be understood by those skilled in the art that even the central buffer does not include an encryption block (for example, the central buffer 200 to central buffer 500 illustrated in FIGS. 2 to 5) in some embodiments, the central buffer may also include a tagging block coupled to the compression block to tag the compressed access history information, therefore the compressed access history information can be conveniently classified. For example, for the central buffer 300 illustrated in FIG. 3 in which the compression algorithm and/or the access recognition rule can be dynamically configured, a tagging block (for example, the tagging block 618 illustrated in FIG. 6) can tag the information based on the time point at which the access history information is generated (for example, the compression algorithms and/or the access recognition rules used at different time points may be different) or can tag the information based on the contents of the access history information (for example, the compression algorithms and/or the access recognition rules used for access history information containing different contents may be different), therefore the compression algorithm and/or the access recognition rule used for each piece of access history information can be determined based on the tag generated by the tagging block.

It should be noted that the circuit structure of the central buffers illustrated in FIG. 2 to FIG. 6 are only exemplary and in practice, the circuit structure of the central buffer can be modified based on practice needs, for example, combining the blocks included in the central buffers illustrated in FIG. 2 to FIG. 6 or deleting the blocks included in the central buffers illustrated in FIG. 2 to FIG. 6. For example, in some embodiments, the central buffer may include one, some or all of the configuration block (e.g., the configuration block 310 illustrated in FIG. 3), the recording block (e.g., the recording blocks 412 and 514 illustrated in FIG. 4 and FIG. 5), the encryption block (e.g., the encryption block 616 illustrated in FIG. 6) and the tagging block (e.g., the tagging block 618 illustrated in FIG. 6).

Figure 7:
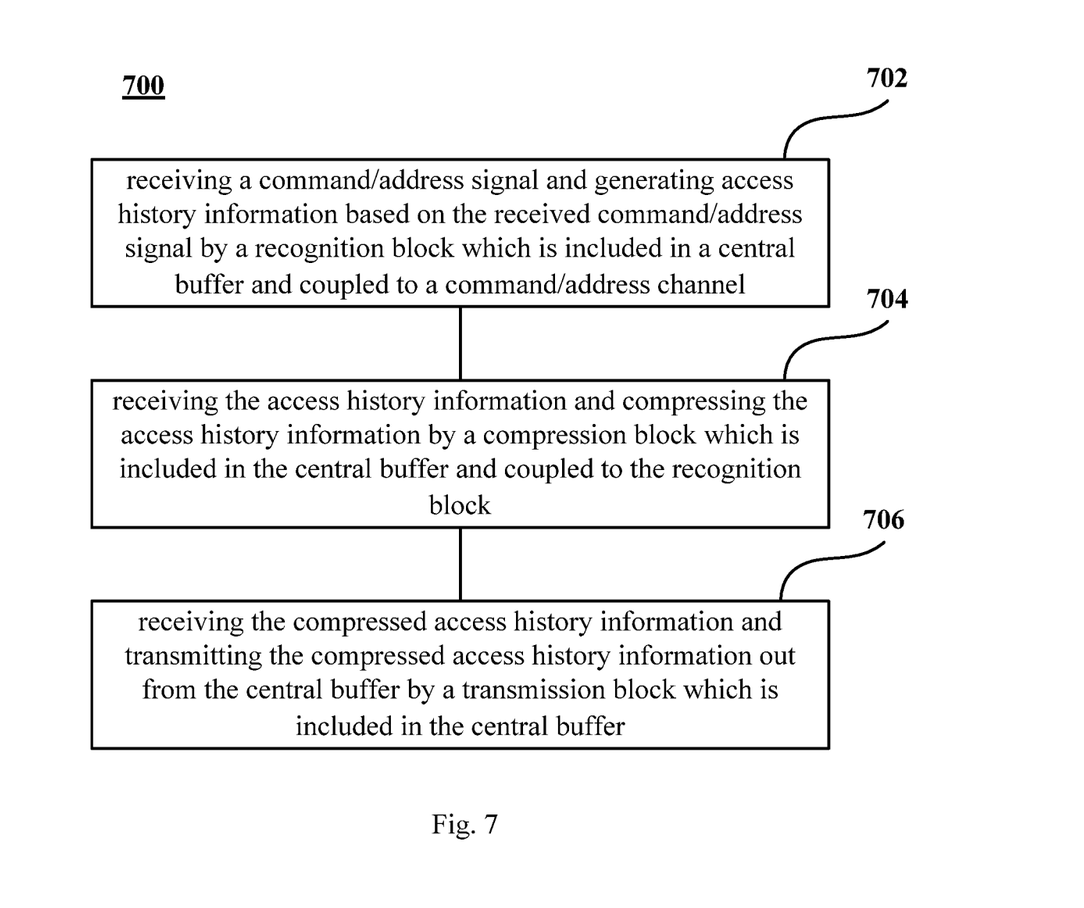
FIG. 7 illustrates a method for monitoring accesses to a memory module according to an embodiment of the present application.

FIG. 7 illustrates a method 700 for monitoring accesses of a host controller to a memory module according to one embodiment of the present application. The method 700 can be performed by the central buffers 200 to 600 illustrated in FIGS. 2 to 6.

As shown in FIG. 7, the method 700 includes: a step 702 of receiving a command/address signal and generating access history information based on the received command/address signal by a recognition block which is included in a central buffer and coupled to a command/address channel; a step 704 of receiving the access history information and compressing the access history information by a compression block which is included in the central buffer and coupled to the recognition block; a step 706 of receiving the compressed access history information and transmitting the compressed access history information out from the central buffer by a transmission block which is included in the central buffer.

In some embodiments, the step 702 may include generating the access history information based on an access recognition rule included in the recognition block which is used for filtering and recognizing the command/address signal. In some embodiments, the access recognition rule includes information of a predefined address space, and the step 704 further includes determining whether an address included in the received command/address signal is within the predefined address space and converting the received command/address signal into the access history information in response to determining that the address included in the received command/address signal is within the predefined address space.

In some embodiments, the step 704 further includes compressing the access history information based on a compression algorithm.

In some embodiments, the method 700 further includes configuring the rule or the algorithm used by the central buffer via a configuring block included in the central buffer. In some embodiments, the method 700 includes receiving configuration data from the host controller and configuring the rule or the algorithm used by the central buffer with the configuration data.

In some embodiments, the method 700 includes transmitting the compressed access history information out from the central buffer via an output channel coupled to the host controller or to another external controller. In some embodiments, the output channel includes one of a PCIe channel, a CXL channel and a Wireless channel.

In some embodiments, the method 700 includes storing the access history information. In some embodiments, the method 700 includes storing the access history information by a first recording block coupled to the recognition block. In some embodiments, the first recording block is also coupled to the compression block and the step 704 further includes receiving the access history information via the first recording block.

In some embodiments, the method 700 further includes storing the compressed access history information. In some embodiments, the method 700 includes storing the compressed access history information by a second recording block coupled to the compression block. In some embodiments, the second recording block is also coupled to the transmission block and the step 704 further includes receiving the compressed access history information via the second recording block.

In some embodiments, the method 700 further includes encrypting the compressed access history information by an encryption block included in the central buffer. In some embodiments, the encryption block includes a plurality of encryption algorithms, and this step further includes selecting one of the plurality of encryption algorithms to encrypt the compressed access history information.

In some embodiments, the method further includes: tagging one or more pieces of the compressed and encrypted access history information by a tagging block included in the central buffer to identify different pieces of the compressed access history information and distinguish the used encryption algorithm.

It should be noted that although several modules or sub-modules used in memory controller and several steps of an intensive computation method have been described in the previous paragraphs, such division is exemplary and not mandatory. Practically, according to the embodiments of the present disclosure, the functions and features of two or more modules described above may be embodied in one module. On the other hand, the functions and features of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present disclosure, one element may conduct functions of several technical feature recited in claims. Any reference signs in the claims should not be construed as limiting the scope. The scope and spirit of the present application are defined by the appended claims.

What is claimed is:

1. A memory controller coupled between a memory module and a host controller to control accesses of the host controller to the memory module, the memory controller comprising:
    a central buffer coupled between the memory module and the host controller via a command/address channel, wherein the central buffer is configured to receive a command/address signal from the host controller and provide the command/address signal to the memory module, the central buffer comprising:
        a recognition block coupled to the command/address channel to receive the command/address signal, wherein the recognition block is configured to generate access history information based on the received command/address signal,
        a compression block coupled to the recognition block to receive the access history information, wherein the compression block is configured to compress the access history information; and
        a transmission block, wherein the compressed access history information is transmitted out from the central buffer via the transmission block.

2. The memory controller of claim 1, wherein the recognition block comprises an access recognition rule used for filtering and recognizing access/address signals, and the recognition block is configured to generate the access history information based on the access recognition rule.

3. The memory controller of claim 2, wherein the access recognition rule comprises information about a predefined address space, and the recognition block is configured to convert the received command/address signal into the access history information based on whether an address included in the received command/address signal is within the predefined address space.

4. The memory controller of claim 1, wherein the compression block has a compression algorithm used for compressing the access history information.

5. The memory controller of claim 1, wherein the central buffer further comprises a configuration block via which a rule or an algorithm used by the central buffer is configured in advance or dynamically.

6. The memory controller of claim 5, wherein the central buffer is further configured to receive configuration data from the host controller, and the configuration block is configured to configure the rule or the algorithm used by the central buffer with the configuration data.

7. The memory controller of claim 1, wherein the transmission block comprises an output channel coupled to the host controller or to another external controller.

8. The memory controller of claim 7, wherein the output channel comprises one of a PCIe channel, a CXL channel, a SMBus channel, a DCA channel and a Wireless channel.

9. The memory controller of claim 1, wherein the central buffer further comprises a recording block coupled to the recognition block to receive and store the access history information.

10. The memory controller of claim 9, wherein the recording block is further coupled to the compression block, and the compression block receives the access history information from the recognition block via the recording block.

11. The memory controller of claim 1, wherein the central buffer further comprises a recording block coupled to the compression block to receive and store the compressed access history information.

12. The memory controller of claim 11, wherein the recording block is further coupled to the transmission block, and the transmission block receives the compressed access history information from the compression block via the recording block.

13. The memory controller of claim 1, wherein the central buffer further comprises an encryption block configured to encrypt the compressed access history information.

14. The memory controller of claim 1, wherein the central buffer further comprises a tagging block configured to tag one or more pieces of the compressed access history information to identify different pieces of the compressed access history information.

15. The memory controller of claim 13, wherein the encryption block is further configured to select, in advance or dynamically, one of a plurality of encryption algorithms to encrypt the compressed access history information.

16. The memory controller of claim 15, wherein the central buffer further includes a tagging block configured to tag one or more pieces of the compressed and encrypted access history information to identify different pieces of the compressed access history information and distinguish among the encryption algorithms used in the encryption of the access history information.

17. A method for monitoring accesses to a memory module, wherein the memory module is coupled to a host controller via a memory controller, the memory controller comprises a central buffer which is coupled between the host controller and the memory controller via a command/address channel, and the central buffer is configured to receive a command/address signal from the host controller and provide the command/address signal to the memory module, the method comprising:
  receiving the command/address signal and generating access history information based on the received command/address signal by a recognition block in the central buffer and coupled to the command/address channel;
  receiving the access history information and compressing the access history information by a compression block in the central buffer and coupled to the recognition block; and
  receiving the compressed access history information and transmitting the compressed access history information out from the central buffer by a transmission block in the central buffer.

18. The method of claim 17, wherein the recognition block comprises an access recognition rule used for filtering and recognizing the access/address signal, and generating access history information based on the received command/address signal comprises generating the access history information based on the access recognition rule.

19. The method of claim 18, wherein the access recognition rule comprises information about a predefined address space, and generating access history information based on the received command/address signal comprises:
  determining whether an address included in the received command/address signal is within the predefined address space; and
  in response to determining that the address included in the received command/address signal falls into the predefined address space, converting the received command/address signal into the access history information.

20. The method of claim 17, wherein compressing the access history information comprises compressing the access history information based on a compression algorithm included in the compression block.

21. The method of claim 17, wherein the method further comprises configuring a rule or an algorithm used by the central buffer in advance or dynamically through a configuration block in the central buffer.

22. The method of claim 21, wherein configuring the rule or the algorithm used by the central buffer comprises receiving configuration data from the host controller so the rule or the algorithm used by the central buffer is configured with the configuration data.

23. The method of claim 17, wherein transmitting the compressed access history information out from the central buffer comprises transmitting the compressed access history information out from the central buffer via an output channel coupled to the host controller or to another external controller.

24. The method of claim 23, wherein the output channel comprises one of a PCIe channel, a CXL channel, a SMBus channel, a DCA channel and a Wireless channel.

25. The method of claim 17, wherein the method comprises storing the access history information by a recording block in the central buffer and coupled to the recognition block.

26. The method of claim 25, wherein the recording block is further coupled to the compression block, and receiving the access history information comprises receiving the access history information via the recording block.

27. The method of claim 17, wherein the method comprises storing the compressed access history information by a recording block in the central buffer and coupled to the compression block.

28. The method of claim 27, wherein the recording block is further coupled to the transmission block, and receiving the compressed access history information comprises receiving the compressed access history information via the recording block.

29. The method of claim 17, wherein method further comprises encrypting the compressed access history information by an encryption block in the central buffer.

30. The method of claim 17, wherein the method further comprises tagging one or more pieces of the compressed access history information by a tagging block in the central buffer to identify different pieces of the compressed access history information.

31. The method of claim 29, wherein the encryption block comprises a plurality of encryption algorithms, and encrypting the compressed access history information comprises selecting, in advance or dynamically, one of the plurality of encryption algorithms to encrypt the compressed access history information.

32. The method of claim 31, wherein the method further comprises tagging one or more pieces of the compressed and encrypted access history information by a tagging block in the central buffer to identify different pieces of the compressed access history information and distinguish among the encryption algorithms used in the encryption of the access history information.

* * * * *